March 24, 1936.  A. J. WILLIAMS, JR  2,034,787
SYSTEM FOR GENERATING ALTERNATING CURRENT
Filed July 23, 1932  2 Sheets-Sheet 1
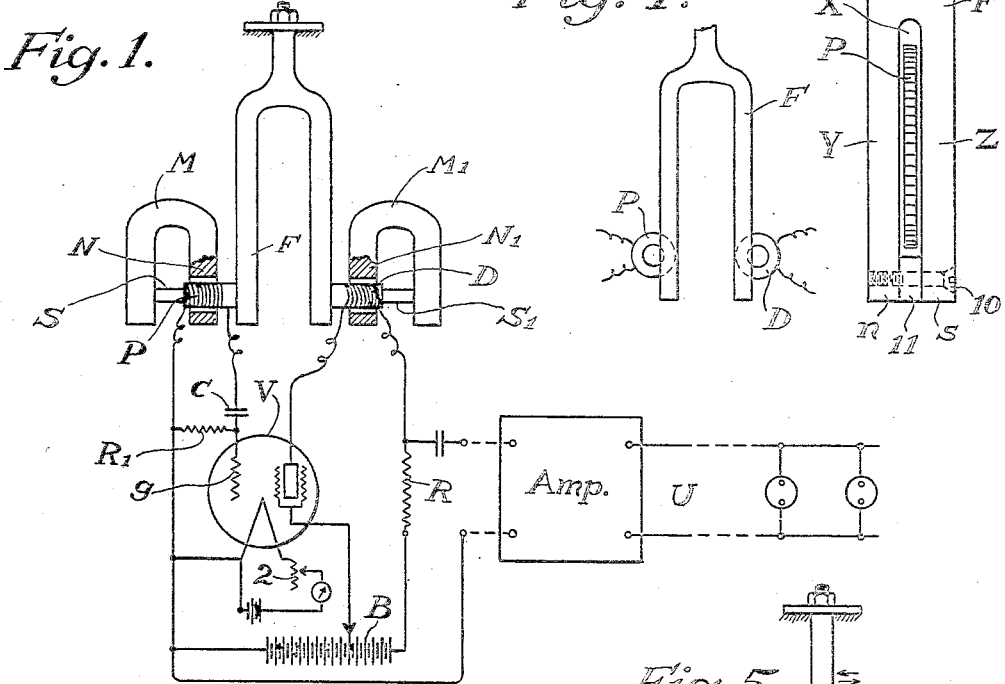
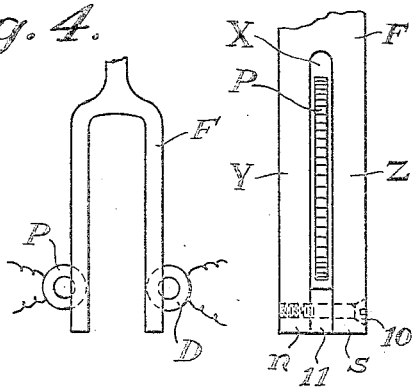
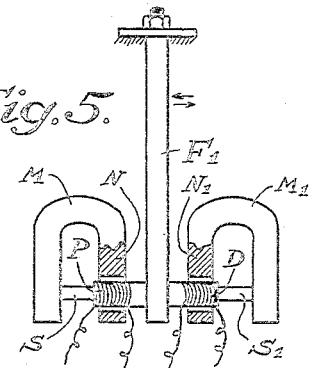
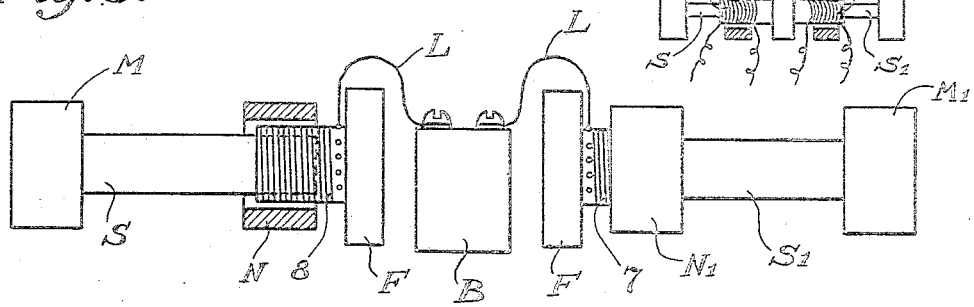
INVENTOR.
Albert J. Williams Jr
BY Cornelius D. Ehret
his ATTORNEY.

March 24, 1936.  A. J. WILLIAMS, JR  2,034,787
SYSTEM FOR GENERATING ALTERNATING CURRENT
Filed July 23, 1932    2 Sheets-Sheet 2

INVENTOR.
Albert J. Williams Jr
BY Cornelius D. Ehret
his ATTORNEY.

Patented Mar. 24, 1936

2,034,787

UNITED STATES PATENT OFFICE 2,034,787

SYSTEM FOR GENERATING ALTERNATING CURRENT

Albert J. Williams, Jr., Philadelphia, Pa., assignor to Leeds & Northrup Company, Philadelphia, Pa., a corporation of Pennsylvania Application July 23, 1932, Serial No. 624,335

9 Claims. (Cl. 250—36)

My invention relates to systems for maintaining a tuning fork, or the like, in continuous vibration at a constant, desired frequency.

In accordance with my invention, the pick-up and driving coils, connected respectively in the input and output circuits of a vacuum tube, are carried by the fork tines and each moves in a magnetic field of substantially uniform intensity; more specifically, the fork tines are beyond the magnetic field to avoid frequency errors due to variation in magnetic attraction and/or to phase shifts due to eddy currents in the fork.

More particularly, the pickup coil is connected directly in the grid circuit of the tube and is preferably of low impedance compared to the grid impedance so that the voltage applied to the grid is directly in phase with the velocity of the fork tines, and the driving coil preferably of low impedance, is connected in series with the plate circuit of the tube, which has high impedance compared to the coil so that the current of the driving coil is in phase with the grid voltage.

Further in accordance with my invention, the impedance in the output circuit of the tube for coupling it to a system for utilizing the constant frequency is of a magnitude which is low compared to the plate circuit impedance so that no appreciable shift in frequency results from the load or variations in load of the utilization system.

Further in accordance with my invention, there is included in the grid circuit of the tube, a network, specifically a combination of resistance and capacity, which limits the amplitude of the driving current, maintains the amplitude of vibration substantially constant under varying conditions of tube supply voltages, and permits rapid acceleration of the fork to the desired amplitude from rest.

My invention further resides in the features of combination and arrangement hereinafter described and claimed.

For an understanding of my invention and for illustration of a preferred form of apparatus, reference is to be had to the accompanying drawings in which:

Fig. 1 illustrates diagrammatically the arrangement and circuit connections of the elements of my system.

Fig. 3 is an end elevational view of parts shown in Fig. 2, and with parts broken away.

Fig. 4 illustrates a modified form of dynamic drive.

Fig. 4a is a detail view of parts shown in Fig. 4.

Fig. 5 illustrates a further modification.

Figure 2:
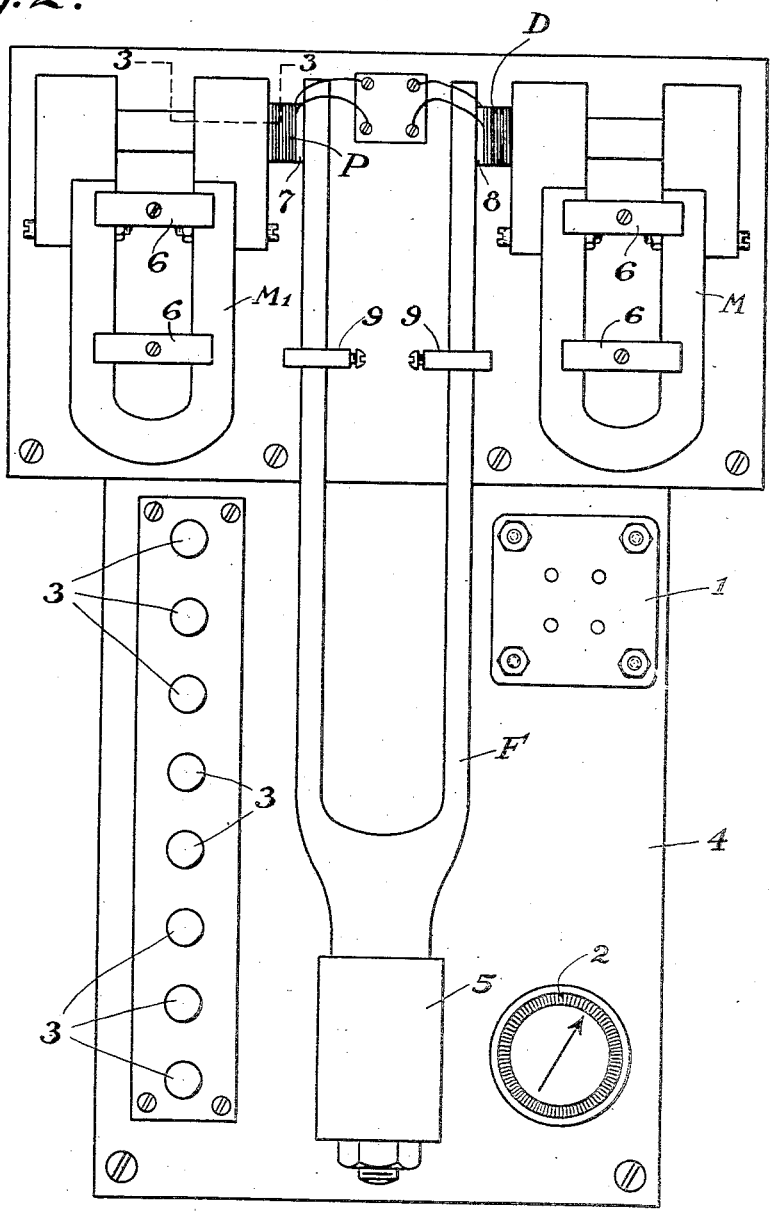
Fig. 2 is a top plan view of parts shown in Fig. 1 arranged as a physical unit.

Heretofore it has been proposed to drive a tuning fork from a vacuum tube by disposing the fork so that its tines were adjacent to electromagnets whose coils were connected respectively in the plate and grid circuits of the tube. However, with this arrangement the frequency at which the fork is driven does not correspond to its free period and moreover the driven frequency is affected by several variable factors, including the supply voltages of the vacuum tube.

I have determined that the polarizing flux of the coils acting upon the fork produced a change in the apparent stiffness of the fork which resulted in its vibration at a frequency lower than the true or free fork frequency. I have also determined that in addition to a change in frequency due to change in apparent stiffness by the polarizing flux, there was a second and further change of frequency when the tube was connected because of a phase shifting effect. It was found by experiment that the force applied to the tine by the vacuum tube was not in phase with the velocity of the tine and therefore had a component in quadrature. The de-phasing also produced a change in apparent stiffness of the fork, or otherwise expressed, a change in its period of vibration. The cause of the phase-shift appears to be eddy currents in the fork which displace the phase of the magnetic flux with reference to the magnetizing force.

In accordance with the present invention in one of its aspects, the parts in magnetic fields and having motion relative thereto are themselves non-magnetic.

Referring to the drawings, Figs. 1 to 3, the pickup coil P, included in the grid circuit of the tube V, is carried by and is movable with one tine of the fork F and similarly the driving coil D, included in the plate circuit of the tube, is mounted upon the other tine of the fork. The coils are wound upon hollow forms 7, 8 of suitable non-magnetic material, as fibre, "Bakelite," or the like.

The pickup coil P is movable in the annular air gap formed by the opening in one pole piece N of the permanent magnet M and the stud pole S extending into the opening, as appears most clearly in Fig. 3 of the drawings. Similarly the driving coil D surrounds the end of pole piece S1 of a second permanent magnet M1 whose other pole N1, is provided with an opening adapted to receive the coil D.

For all practical purposes, the fields of the devices M and M1, concentrated in the small air gaps between their poles, are isolated from the tines of the fork F so that the position of the fork tines with respect to the devices has no appreciable effect upon its stiffness. In any event, the fork tines do not vibrate, as in the prior arrangements, in zones of widely varying magnetic intensity.

In the arrangement shown utilizing the dynamic principle, each coil works in a radial magnetic field; the motion of the fork, the field, and the conductors are mutually at right-angles so that there are no secondary or incidental effects such as are present in the magnetic type of drive.

Preferably the pick-up coil P is connected directly to the grid $g$ of the tube in order that the voltage applied to the grid may be directly in phase with the velocity of the tine carrying the coil P. To insure this phase relation, the impedance of the coil should be low compared to the grid circuit impedance.

The driving coil D is in the plate circuit of the tube and is preferably of low impedance compared to the plate impedance of the tube so that the current in the coil is in phase with the voltage on the grid.

Preferably as shown, the tube V is of the screen grid type, as for example, a "—32" tube, since this type of tube has very high plate impedance, facilitating high ratio of plate impedance to coil impedance. With this type tube, both coils may comprise about 2000 turns of .0015 inch enameled copper wire, though the number of turns, size of wire, etc., are not critical if the above general relations are satisfied.

The force on the driving coil time is in phase with the current, which as above stated is in phase with the grid voltage.

With this dynamic drive arrangement, the two principal sources of frequency error are eliminated. The driving force, being in phase with the fork velocity, has no component in quadrature thereto; i. e., there is no component in phase with the fork position and there is no change in effective stiffness of the fork which would change the fork period. It is also more efficient than the magnetic type of drive. It develops a large electromotive force from the pick-up coil for a small velocity of the fork and develops a large driving force for a small current in coil D with the result that the fork is easily kept in vibration and rapidly accelerates from rest. This efficiency is taken advantage of by using only a small screen grid tube operating with a plate battery B of about 45 volts, in which case the plate current is only .0005 amperes. Except for the high efficiency of the construction it would not be possible to use small permanent magnets M and M1 for the fields. Of course, there are no objections except unnecessary cost and bulk to using large permanent magnets, or in furnishing the fields by electromagnets.

As shown most clearly in Fig. 2, the apparatus can be assembled in a simple, compact unit. The socket 1 for the tube V, the resistance 2 for varying the cathode heating current of the tube, and the terminals 3 for making the connections to the tube may all be mounted upon the base 4 from which extends the support 5 for the shank of the tuning fork F. The magnets M and M1 are suitably held, as by the clamps 6 to the base with their pole pieces in proper relation with respect to the forms 7 and 8 of the pick-up and driving coils respectively. The leads L to the coils for connecting them in circuit with tube V are preferably bow-shaped pieces of conductor such as are ordinarily used for galvanometer suspensions. As shown most clearly in Fig. 3, the leads from the connection block B to the coils arch over the fork tines. Leads of this construction and disposition can withstand the continual vibration and without exerting any variable effect upon the fork frequency.

As shown most clearly in Fig. 3, the coil forms 7 and 8 are preferably provided with a series of vents to reduce air damping.

The tuning fork F may be bimetallic to reduce or eliminate the effect of temperature upon the fork frequency or may be of an alloy having negligible temperature coefficient of elasticity as "Elinvar". Temperature control can be dispensed with for many uses of the unit, but in any event, the temperature control may be of any simple known arrangement.

Adjustment of the fork frequency can be effected by changing the position of the weights 9. Large weights should not be used as there is danger of introducing an unbalance between the two tines which would make the fork frequency depend upon the base of the fork and its mounting. Very precise control of the frequency can be obtained by controlling the fork temperature for example by changing the setting of the thermostat controlling the ambient temperature of the fork.

Referring again to Fig. 1, the impedance R for coupling the output circuit of the tube to a system U for utilizing the constant frequency developed, is preferably of a magnitude which is low relative to the plate circuit impedance so that the load of the utilization circuit or variations in that load will not introduce any appreciable phase shift; for example, in the arrangement above specifically described, impedance R may be a resistor of about 1000 ohms, so that no value of load can change the impedance, as seen by the plate, by more than 1000 ohms; a magnitude so small relative to the plate impedance that it will not change the frequency by more than .001 per cent. Variations in frequency due to other changes in the electrical circuit are in general too small to observe except very large changes in B battery voltage, and even with a drop of 45 per cent in this voltage the frequency changed only a few thousandths of one per cent. Variations in frequency with all other variables including time are small, the frequency remaining constant to within .001 per cent for a period extending over many months. Moreover, the frequency at which the fork is driven is extremely close to its free period, i. e., the difference is only of the order of .001%. The dynamic drive is particularly effective when the frequency to be produced is comparatively low; i. e., of the order of 60 cycles per second.

In previous arrangements, if the amplification is made great enough to ensure that the fork will be maintained in vibration, the amplitude of vibration builds up to a value much greater than is consistent with constant frequency. In the arrangement shown in Fig. 1 the amplification is initially high, in order that the fork may rapidly accelerate from rest to the desired amplitude, and is thereafter reduced automatically by rectifying action of the tube to maintain the amplitude of vibration substantially constant, even under varying conditions such as battery voltage. To accomplish this result, a condenser C of suitable value, for example, .1 microfarad, is connected between the pick-up coil P and the grid. As the device goes into operation a negative charge accumulates in the condenser, making the grid more negative and so reducing the amplification of the tube. The resistance R1 of suitably high value, for example, 10 megohms, is connected between the grid and cathode to permit some of this charge to leak off, so that the grid will not become so highly negative as to cut off the plate current, i. e., the resistance prevents "blocking" of the tube.

In the modification shown in Figs. 4 and 4a, the pick-up coil and driving coils P and D are stationary. Each tine of the fork, as shown most clearly in Fig. 4a, is divided by a slot X extending parallel to the plane of vibration and is magnetized so that in effect the end of the tine forms a U magnet having legs Y and Z and producing a field at right angles to the direction of movement of the fork. Vibration of the fork effects relative movement of each of the coils with respect to the field of the associated magnet. To ensure vibration of the legs as a unitary tine, their ends are suitably clamped together, as by the screw 10 which holds them tight against the nonmagnetic spacer 11. The arrangement is the equivalent of a permanent magnet received at the end of the fork with its legs disposed to form a field at right angles to the fork movement.

Each of the coils P and D are wound in thin or pancake form to clear the sides of slot X and as shown is disposed with its axis normal to the plane of vibration of the fork tine. As in the prior modification, the magnetic fields are at right angles to the fork movement, and do not affect the stiffness of the fork. The coils may be connected in circuit with a tube as in Fig. 1.

The dynamic drive is of course applicable to vibratory structures other than tuning forks, for example, it can be applied to a vibratory rod or bar F1, as in Fig. 5. As shown, the coil forms 7 and 8 for the pick-up and driving coils are carried by the bar F, for movement in the fields of magnets M and M1. The circuit relation of the coils and the operation of the drive is the same as Fig. 1.

The arrangement of Fig. 1 may be modified in accordance with Fig. 5 by mounting a pick-up coil and driving coil on each tine. The pick-up coils are connected together, as in series, and the driving coils are similarly connected, the system operating as above described in connection with Fig. 1.

While I have illustrated several preferred arrangements for purposes of explanation, my invention is not limited thereto but corresponds in scope with the appended claims.

What I claim is:

1. A system comprising vibratory structure, a vacuum tube, a pick-up coil connected to the grid circuit of said tube and whose impedance is low compared to the grid impedance of the tube, and a driving coil directly connected in the plate circuit of said tube and whose impedance is low compared to the plate impedance of the tube whereby the current in the driving coil is in phase with the voltage impressed on the grid by the pick-up coil.

2. A system comprising vibratory structure, a vacuum tube, a pick-up coil directly connected in the grid circuit of said tube and whose impedance is low compared to the grid impedance of the tube, a driving coil directly connected in the plate circuit of said tube and whose impedance is low compared to the plate impedance of the tube, whereby the current in the driving coil is in phase with the voltage impressed on the grid by the pick-up coil, a utilization system, and an impedance in the plate circuit of said tube for coupling to said utilization system having low magnitude of impedance compared to the plate circuit impedance whereby the load and variations in load of said utilization system having insubstantial effect upon the aforesaid phase relation.

3. A system comprising vibratory structure, a vacuum tube, a pick-up coil movable with said structure and included in the input circuit of said tube, a driving coil movable with said structure and included in the output circuit of said tube, means for providing magnetic fields in which said coils are moved by vibration of said structure, and means for reducing damping of the vibration of said structure comprising air vents in the forms for said coils.

4. A system comprising vibratory structure, a vacuum tube, a pick-up coil carried by said structure included in the grid circuit of said tube and whose impedance is low relative to the grid impedance of the tube, a driving coil carried by said structure included in the plate circuit of said tube and whose impedance is low relative to the plate impedance of the tube, and means for providing magnetic field in which said coils are moved by vibration of said structure.

5. In a dynamic drive for a vibratory structure including an amplifying device having input and output circuits, the combination of a vibratory structure, magnetic field means carried by said vibratory structure, a stationary pick-up coil adjacent said structure and disposed in the magnetic field thereof having its axis normal to the direction of movement of said structure and having terminals for connection to the input circuit of said amplifying device, and a stationary driving coil adjacent said structure and disposed in the magnetic field thereof having its axis normal to the direction of movement of said structure and having terminals for connection to the output circuit of said device.

6. In a dynamic drive for a vibratory structure including a vacuum tube having input and output circuits, the combination of a tuning fork whose tines each terminate in magnetized structure producing a field at right angles to the fork movement, a pick-up coil in one of said fields disposed with its axis normal to the fork movement and having terminals for connection to the input circuit of said tube, and a driving coil in the other of said fields disposed with its axis normal to the fork movement and having terminals for connection to the output circuit of said tube.

7. A vibratory system comprising a vibratory element supported adjacent one end, driving and pick-up coils supported therefrom near its free end and projecting outwardly and oppositely therefrom, and means for producing a magnetic field or fields normal to the vibration of said element, said coils being mounted in said magnetic field or fields.

8. A vibratory system comprising a tuning fork, driving and pick-up coils supported from the tines of said fork near the ends thereof and projecting outwardly and oppositely therefrom, and means for producing a magnetic field or fields normal to the vibration of said tines, said coils being mounted in said magnetic field or fields.

9. A vibratory system comprising a vibratory element supported adjacent one end, driving and pick-up coils supported therefrom near its free end and projecting outwardly therefrom in opposite directions, means for producing a magnetic field or fields normal to the vibration of said element, said coils being mounted in said magnetic field or fields, and means for energizing said driving coil comprising means for deriving and amplifying an electrical quantity from said pick-up coil.

ALBERT J. WILLIAMS, Jr.

CERTIFICATE OF CORRECTION.

Patent No. 2,034,787.  March 24, 1936.

ALBERT J. WILLIAMS, JR.

It is hereby certified that error appears in the printed specification of the above numbered patent requiring correction as follows: Page 2, first column, line 49, for the word "time" read tine; page 3, second column, line 2, claim 1, after "tube" insert a comma; and that the said Letters Patent should be read with these corrections therein that the same may conform to the record of the case in the Patent Office.

Signed and sealed this 4th day of August, A. D. 1936.

Henry Van Arsdale

(Seal) Acting Commissioner of Patents.